United States Patent
Nayak et al.

(10) Patent No.: US 11,378,011 B2
(45) Date of Patent: *Jul. 5, 2022

(54) DECOUPLER ASSEMBLIES FOR ENGINE STARTER

(71) Applicant: Unison Industries, LLC, Jacksonville, FL (US)

(72) Inventors: Subrata Nayak, Bangalore (IN); Eliel Fresco Rodriguez, Springboro, OH (US); David Allan Dranschak, Union, OH (US); Shiloh Montgomery Emerson Meyers, Dayton, OH (US); Pallavi Tripathi, Bangalore (IN)

(73) Assignee: Unison Industries, LLC, Jacksonville, FL (US)

( * ) Notice: Subject to any disclaimer, the term of this patent is extended or adjusted under 35 U.S.C. 154(b) by 98 days.

This patent is subject to a terminal disclaimer.

(21) Appl. No.: 16/719,265

(22) Filed: Dec. 18, 2019

(65) Prior Publication Data

US 2020/0141324 A1 May 7, 2020

Related U.S. Application Data

(63) Continuation of application No. 15/595,371, filed on May 15, 2017, now Pat. No. 10,519,866.

(51) Int. Cl.
| | |
|---|---|
| *F02C 7/277* | (2006.01) |
| *F02C 7/36* | (2006.01) |
| *F01D 25/24* | (2006.01) |
| *F01D 5/02* | (2006.01) |
| *F01D 19/00* | (2006.01) |

(52) U.S. Cl.
CPC ............ *F02C 7/277* (2013.01); *F01D 5/02* (2013.01); *F01D 19/00* (2013.01); *F01D 25/24* (2013.01); *F02C 7/36* (2013.01); *F05D 2220/32* (2013.01); *F05D 2240/60* (2013.01); *F05D 2260/404* (2013.01); *F05D 2260/85* (2013.01)

(58) Field of Classification Search
CPC .. F01D 5/026; F01D 19/00; F02C 7/26; F02C 7/268; F02C 7/275; F02C 7/277; F02N 15/023; F02N 15/065; F05D 2260/404; F05D 2260/4041; F05D 2260/85
See application file for complete search history.

(56) References Cited

U.S. PATENT DOCUMENTS

| | | | |
|---|---|---|---|
| 2,908,170 | A | 10/1959 | Schindel et al. |
| 3,280,352 | A | 10/1966 | Chapman |

(Continued)

FOREIGN PATENT DOCUMENTS

| | | |
|---|---|---|
| DE | 833 887 C | 3/1952 |
| JP | H09317833 A | 12/1997 |

*Primary Examiner* — Scott J Walthour
(74) *Attorney, Agent, or Firm* — McGarry Bair PC

(57) ABSTRACT

An air turbine starter for starting an engine, comprising a housing defining an inlet, an outlet, and a flow path extending between the inlet and the outlet for communicating a flow of gas there through. A turbine member is journaled within the housing and disposed within the flow path for rotatably extracting mechanical power from the flow of gas. A gear train is drivingly coupled with the turbine member, a drive shaft is operably coupled with the gear train, and an output shaft is selectively operably coupled to rotate with the engine via a decoupler.

20 Claims, 8 Drawing Sheets

(56) References Cited

U.S. PATENT DOCUMENTS

| | | | |
|---|---|---|---|
| 3,350,060 A | | 10/1967 | La Fleur |
| 4,621,197 A | | 11/1986 | Tanaka |
| 4,680,979 A | | 7/1987 | Morishita et al. |
| 4,871,296 A | | 10/1989 | Laessle et al. |
| 5,267,433 A | * | 12/1993 | Burch ............ F16D 47/04 192/104 R |
| 5,716,300 A | | 2/1998 | Sammataro et al. |
| 6,059,085 A | | 5/2000 | Farnsworth |
| 7,728,477 B2 | | 6/2010 | Birdi et al. |
| 7,791,235 B2 | | 9/2010 | Kem et al. |
| 8,105,018 B2 | | 1/2012 | Gockel et al. |
| 10,519,866 B2 | * | 12/2019 | Nayak ............ F02C 7/36 |
| 2009/0199567 A1 | | 8/2009 | Gockel et al. |

* cited by examiner

DECOUPLER ASSEMBLIES FOR ENGINE STARTER

CROSS REFERENCE TO RELATED APPLICATION

The present application is a continuation of U.S. patent application Ser. No. 15/595,371, filed May 15, 2017, and now allowed, which is incorporated herein by reference in its entirety.

BACKGROUND

An aircraft engine, for example a gas turbine engine, is engaged in regular operation to an air turbine starter. The internal components of both the gas turbine engine and the air turbine starter spin together and can each include gearboxes allowing for step down or step up ratios between consecutive parts. To prevent back drive, an overrunning clutch is placed between the air turbine starter output shaft and the air turbine starter gearbox section. Back drive events can occur with an overrunning clutch failure in the engaged position, when the engine drives the output shaft of the air turbine starter resulting in over spinning a turbine rotor in the air turbine starter. In a back drive event, it can be desirable to decouple the air turbine starter from the gas turbine engine.

BRIEF DESCRIPTION

In one aspect, the present disclosure relates to an air turbine starter for starting an engine, comprising a housing defining an inlet, an outlet, and a flow path extending between the inlet and the outlet for communicating a flow of gas there through, a turbine member journaled within the housing and disposed within the flow path for rotatably extracting mechanical power from the flow of gas, a gear train drivingly coupled with the turbine member, a drive shaft operably coupled with the gear train and having ramped teeth on its output end, and a decoupler, comprising an output shaft having a first end with mating ramped teeth that are selectively operably coupled to the drive shaft and a second end configured to be operably coupled to and rotate with the engine, the ramped teeth allow for driving torque transfer from the drive shaft to the output shaft and the ramped teeth slide on each other when back driving torque is transmitted such that the output shaft is moved away from the drive shaft, and a connector having a body with a first and second end and extending between the output shaft and the drive shaft a magnetic coupling selectively linking the drive shaft to the output shaft via the connector, when driving torque is transmitted the connector is magnetically linked to one of the output shaft or the drive shaft via the magnetic coupling and when back driving torque is transmitted the connector is moved away from at least a portion of the magnetic coupling.

In another aspect the present disclosure relates to an air turbine starter for starting an engine, comprising a housing defining an inlet, an outlet, and a flow path extending between the inlet and the outlet for communicating a flow of gas there through, a turbine member journaled within the housing and disposed within the flow path for rotatably extracting mechanical power from the flow of gas, a gear train drivingly coupled with the turbine member, a drive shaft operably coupled with the gear train and having an output end, an intermediate connector having a body with a first end operably coupled to the output end of the drive shaft and a second end, opposite the first end, having ramped teeth, an output shaft having a first end with mating ramped teeth that are selectively operably coupled to the intermediate connector and a second end configured to be operably coupled to and rotate with the engine, the ramped teeth allow for driving torque transfer from the intermediate connector to the output shaft and the ramped teeth slide on each other when back driving torque is transmitted such that the intermediate connector is moved away from the output shaft, a connector having a first end coupled to the intermediate connector and a second end selectively operably coupled to the output shaft; and a magnetic coupling dipole mounted within the drive shaft and configured to magnetically couple with at least one of the intermediate connector or the connector.

DETAILED DESCRIPTION OF THE EMBODIMENTS

Figure 1:
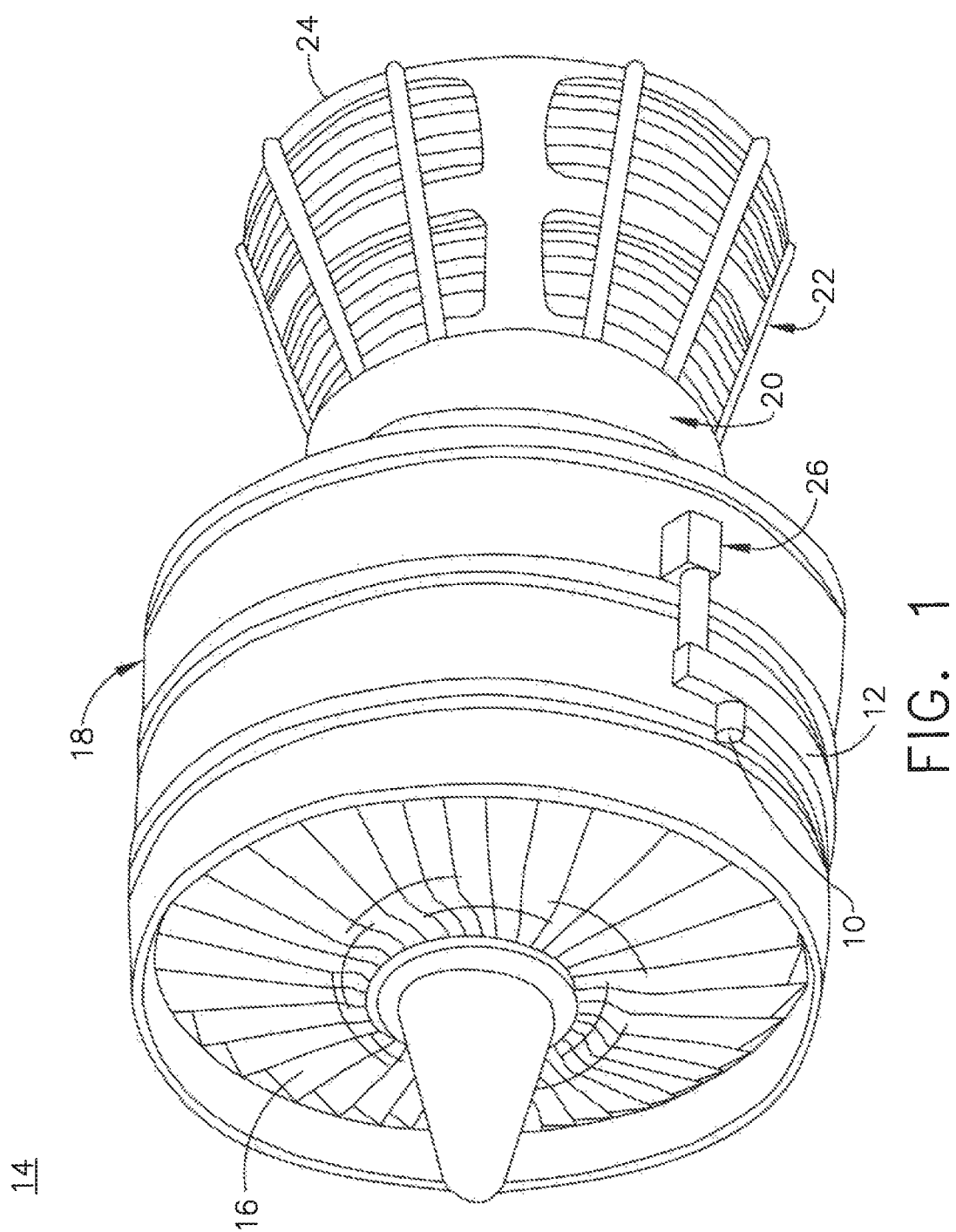
FIG. 1 is a schematic isometric view of a turbine engine with an accessory gearbox and a starter in accordance with various aspects described herein.

The present disclosure is related to a driving mechanism generating kinetic motion in the form of a rotating shaft coupled with a piece of rotating equipment. One non-limiting example is coupling a starter containing more than one component onto an accessory gear box. The starter can have various applications including starting a gas turbine engine. While the examples described herein are directed to application of a turbine engine and a starter, the disclosure can be applied to any implementation of a driving mechanism that generates rotational motion at a driving output and provides the rotational motion to another piece of rotating equipment.

All directional references (e.g., radial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

As used herein, the term "forward" or "upstream" refers to moving in a direction toward the engine inlet, or a component being relatively closer to the engine inlet as compared to another component. The term "aft" or "downstream" refers to a direction toward the rear or outlet of the engine relative to the engine centerline. Additionally, as used herein, the terms "radial" or "radially" refer to a dimension extending between a center longitudinal axis of the engine and an outer engine circumference. It should be further understood that "a set" can include any number of the respectively described elements, including only one element.

Referring to FIG. 1, a starter motor or air turbine starter 10 is coupled to an accessory gear box (AGB) 12, also known as a transmission housing, and together are schematically illustrated as being mounted to a turbine engine 14 such as a gas turbine engine. This assembly is commonly referred to as an Integrated Starter/Generator Gearbox (ISGB). The turbine engine 14 comprises an air intake with a fan 16 that supplies air to a high pressure compression region 18. The air intake with a fan 16 and the high pressure compression region collectively are known as the 'cold section' of the turbine engine 14 upstream of the combustion. The high pressure compression region 18 provides a combustion chamber 20 with high pressure air. In the combustion chamber, the high pressure air is mixed with fuel and combusted. The hot and pressurized combusted gas passes through a high pressure turbine region 22 and a low pressure turbine region 24 before exhausting from the turbine engine 14. As the pressurized gases pass through the high pressure turbine (not shown) of the high pressure turbine region 22 and the low pressure turbine (not shown) of the low pressure turbine region 24, the turbines extract rotational energy from the flow of the gases passing through the turbine engine 14. The high pressure turbine of the high pressure turbine region 22 can be coupled to the compression mechanism (not shown) of the high pressure compression region 18 by way of a shaft to power the compression mechanism. The low pressure turbine can be coupled to the fan 16 of the air intake by way of a shaft to power the fan 16.

The turbine engine can be a turbofan engine, such as a General Electric GEnx or CF6 series engine, commonly used in modern commercial and military aviation or it could be a variety of other known turbine engines such as a turboprop or turboshaft. The turbine engine can also have an afterburner that burns an additional amount of fuel downstream of the low pressure turbine region 24 to increase the velocity of the exhausted gases, and thereby increasing thrust.

The AGB 12 is coupled to the turbine engine 14 at either the high pressure or low pressure turbine region 22, 24 by way of a mechanical power take-off 26. The mechanical power take-off 26 contains multiple gears and means for mechanical coupling of the AGB 12 to the turbine engine 14. Under normal operating conditions, the power take-off 26 translates power from the turbine engine 14 to the AGB 12 to power accessories of the aircraft for example but not limited to fuel pumps, electrical systems, and cabin environment controls. The air turbine starter 10 can be mounted on the outside of either the air intake region containing the fan 16 or on the core near the high pressure compression region 18.

Figure 2:
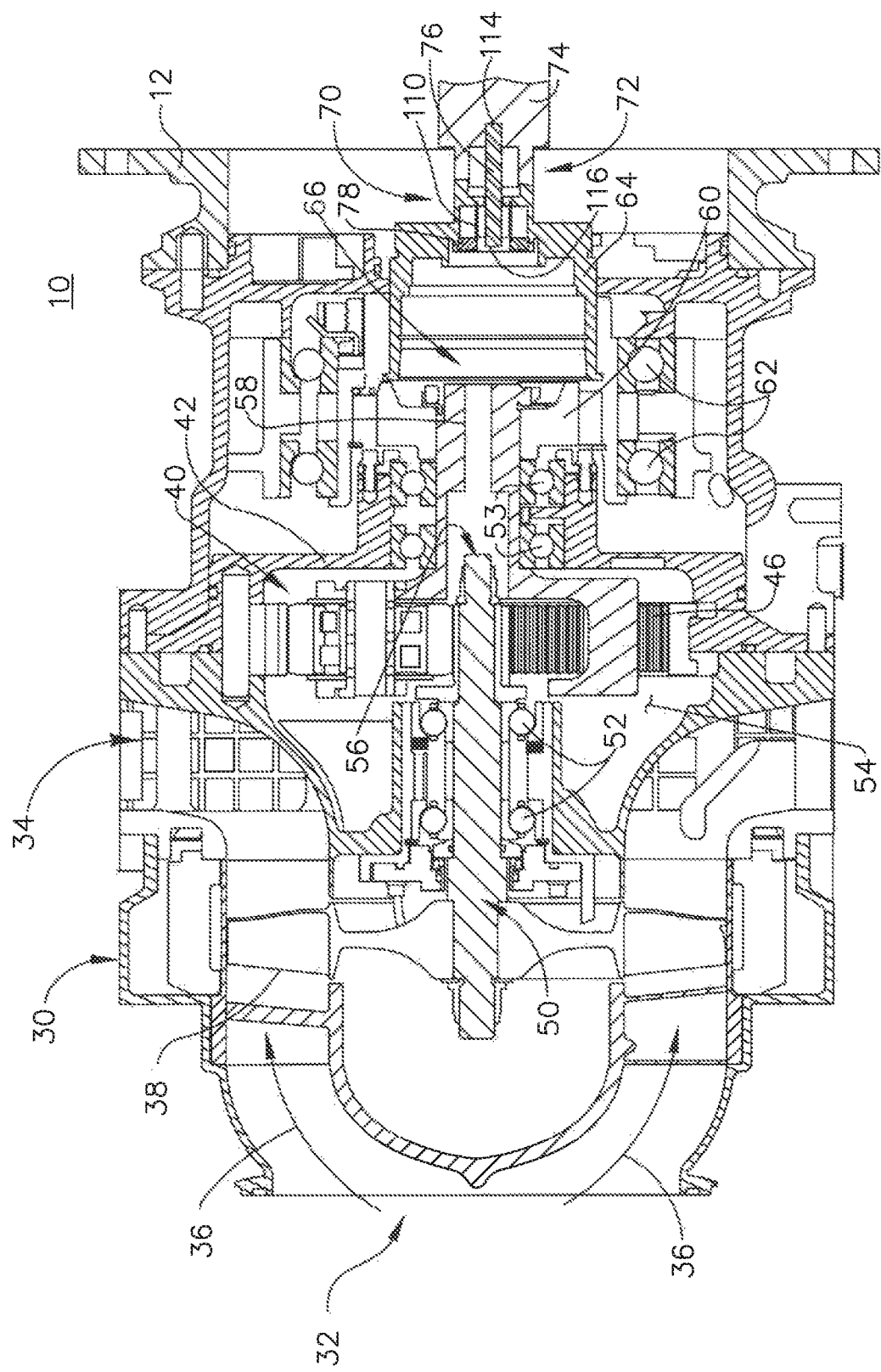
FIG. 2 is an enlarged cross-sectional view of the starter of FIG. 1 in accordance with various aspects described herein.

Referring now to FIG. 2, the air turbine starter 10, which can be mounted to the AGB 12 is shown in greater detail. Generally, the air turbine starter 10 includes a housing 30 defining an inlet 32, an outlet 34, and a flow path 36 extending between the inlet 32 and outlet 34 for communicating a flow of gas there through. In one non-limiting example the gas is air and is supplied from either a ground-operating air cart, an auxiliary power unit, or a cross-bleed start from an engine already operating. The air turbine starter 10 includes a turbine member 38 journaled within the housing 30 and disposed within the flow path 36 for rotatably extracting mechanical power from the flow of gas along the flow path 36. A gear box 42 is mounted within the housing 30. Further, a gear train 40, disposed within the gear box 42 and drivingly coupled with the turbine member 38, can be caused to rotate.

The gear train 40 includes a ring gear 46 and can further comprise any gear assembly including for example but not limited to a planetary gear assembly or a pinion gear assembly. A turbine shaft 50 couples the gear train 40 to the turbine member 38 allowing for the transfer of mechanical power to the gear train 40. The turbine shaft 50 is coupled to the gear train 40 and rotatably supported by a pair of turbine bearings 52. The gear train 40 is supported by a pair of carrier bearings 53. The gear box interior 54 can contain a lubricant, including, but not limited to, a grease or oil to provide lubrication and cooling to mechanical parts contained therein such as the gear train 40, ring gear 46, and bearings 52, 53.

There is an aperture 56 in the gear box 42 through which the turbine shaft 50 extends and meshes with a carrier shaft 58 to which a clutch 60 is mounted and supported by a pair of spaced bearings 62. A drive shaft 64 extends from the gear box 42 and is coupled to the clutch 60 and additionally supported by the pair of spaced bearings 62. The drive shaft 64 is driven by the gear train 40 and coupled to the AGB 12, such that during a starting operation the drive shaft 64 provides a driving motion to the AGB 12.

The clutch 60 can be any type of shaft interface portion that forms a single rotatable shaft 66 comprising the turbine shaft 50, the carrier shaft 58, and the drive shaft 64. The shaft interface portion can be by any known method of coupling including, but not limited to, gears, splines, a clutch mechanism, or combinations thereof. An example of a shaft interface portion is disclosed in U.S. Pat. No. 4,281,942 to General Electric and is incorporated herein by reference in its entirety.

The starter 10 can be formed by any materials and methods, including, but not limited to, die-casting of high strength and lightweight metals such as aluminum, stainless steel, iron, or titanium. The housing 30 and the gear box 42 can be formed with a thickness sufficient to provide adequate mechanical rigidity without adding unnecessary weight to the air turbine starter 10 and, therefore, the aircraft.

The rotatable shaft 66 can be constructed by any materials and methods, including, but not limited to extrusion or machining of high strength metal alloys such as those containing aluminum, iron, nickel, chromium, titanium, tungsten, vanadium, or molybdenum. The diameter of the turbine shaft 50, carrier shaft 58, and drive shaft 64 can be fixed or vary along the length of the rotatable shaft 66. The diameter can vary to accommodate different sizes, as well as rotor to stator spacing.

As described herein, air supplied along the flow path 36 rotates the turbine member 38 for driving the rotation of the rotating shafts 50, 58, 64. Therefore during starting operations, the starter 10 can be the driving mechanism for the turbine engine 14 via rotation of the rotating shafts 50, 58, 64. The non-driving mechanism, that is, the equipment being driven by the driving mechanism, can be understood as rotating equipment utilizing the rotational movement of the rotating shafts 50, 58, 64, for example to generate electricity in the starter 10.

The drive shaft 64 is further coupled to a decoupler assembly 70 including a back drive decoupler 72 having an output shaft 74. The output shaft 74 is configured to be operably coupled to and rotate with the engine 14. A connector 76 is coupled to the output shaft 74 and can extend into a magnetic coupling 78 of the drive shaft 64 to selectively couple the connector 76 to the drive shaft 64. Further, the connector 76 can provide alignment between both the drive shaft 64 and output shaft 74.

Figure 3:
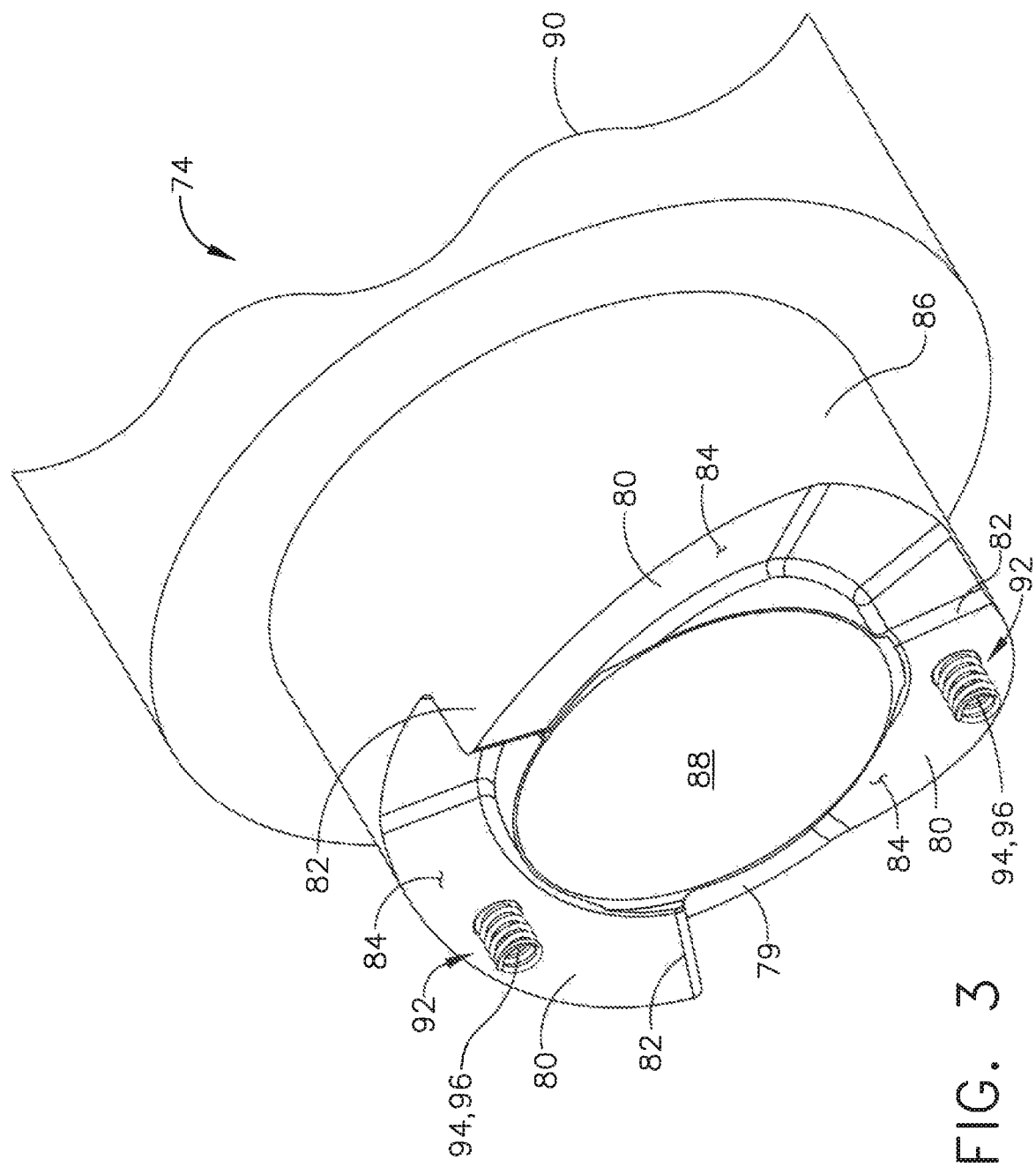
FIG. 3 is an isometric view of a portion of a decoupler assembly that can be utilized in the starter of FIG. 2.

Turning to FIG. 3, the output shaft 74 is illustrated in more detail. A first end 79 includes a set of teeth 80. Each tooth 80 includes a tooth portion 82 and a ramped portion 84. The ramped portion 84 can be, in non-limiting examples, an inclined portion, an angled portion, or an otherwise oriented portion of the tooth 80 to enable engagement in one direction. While three teeth are illustrated, more or less teeth are contemplated. The teeth 80 circumscribe a cylindrical body 86 of the output shaft 74 at the first end 79. The cylindrical body 86 has an interior 88 and terminates in a second end 90. The second end 90 can include any type of coupling mechanism (not shown) to couple the output shaft 74 to the AGB 12. The second end 90 can be of varying lengths depending on the AGB 12 to which it is coupled.

A blocking mechanism 92 can be provided at the first end 79 of the output shaft 74. The blocking mechanism 92 can include a biasing mechanism 94 illustrated in an expanded position. The biasing mechanism 94 is illustrated, by way of non-limiting example, as a compressive spring 96. While shown within the output shaft 74, it is contemplated that the blocking mechanism can be provided on the drive shaft 64 where the first end 79 of the output shaft 74 meets the drive shaft 64.

Figure 4:
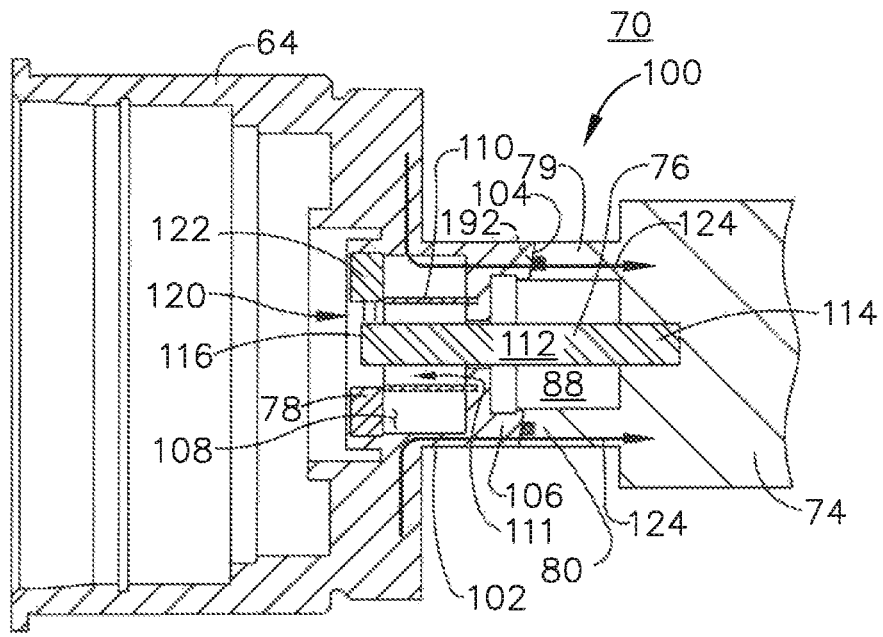
FIG. 4 is a cross-sectional view of the decoupler assembly of FIG. 3 in a first position.

FIG. 4 further illustrates portions of the starter 10 with the decoupler assembly 70 in a first position 100 under normal driving conditions. It is more easily seen, that the drive shaft 64 terminates in a secondary shaft 102 having an output end 104 with complementary teeth 106 for mating with the teeth 80 of the output shaft 74. While not illustrated, the teeth 106 are complementary such that they also include a tooth portion and a ramped portion. The compressive spring 96 illustrated in a retracted position is located within the output shaft 74 at the teeth 80. The secondary shaft 102 further includes an interior 108 in which a sheath 110 is located. The sheath 110 is an open cylinder having an opening 111 through which the fuse 76 can slide. The sheath 110 can be a hollow cylinder made of a highly magnetic permeable material. The sheath 110 can be made of, for example but not limited to, cobalt-iron, copper, ferrite, ferritic stainless steel, or a permalloy.

The connector 76 has a body 112 extending to the interior 108 of the drive shaft 64 and through the interior 88 of the output shaft 74 via the opening 111 where the connector 76 terminates in a first end 114 coupled to the output shaft 74. The connector 76 can be made of any magnetic material, by way of non-limiting example steel. The connector 76 is secured to the output shaft 74 mechanically at the first end 114. The portion of the body 112 that is located within the interior 108 extends through the sheath 110 and beyond where the connector 76 terminates in a second end 116 that extends into the magnetic coupling 78.

The magnetic coupling 78 includes a magnetic dipole 120 formed between, for 3example but not limited to, a collection of permanent magnets 122 and the connector 76. The permanent magnets 122 are arranged circumferentially as magnetic rings around the connector 76 within the secondary shaft 102 of the drive shaft 64. The connector 76 is selectively axially coupled to the drive shaft 64 with the magnetic coupling 78 by the magnetic dipole 120.

A torque path illustrated with arrows 124 runs from the drive shaft 64 through the output end 104 with teeth 106, and the teeth 80 of the output shaft 74, through output shaft 74, and finally continuing to the AGB 12 and engine 14. The teeth 106 and the teeth 80 enable high torque transfer in one direction along the torque path 124. Under normal operating conditions, the torque path 124 allows the drive shaft 64 to provide torque to the AGB 12 to start the engine 14.

Figure 5:
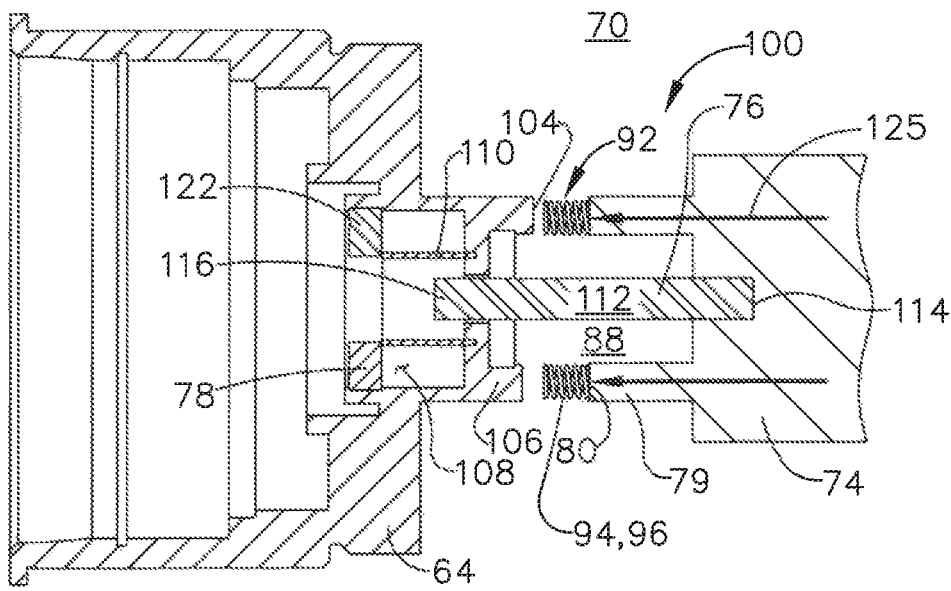
FIG. 5 is a cross-sectional view of the decoupler assembly of FIG. 4 in a second decoupled position.

Turning to FIG. 5, in the event of a back drive condition where the torque path 125 reverses direction, the output end 104 at the drive shaft 64 and output shaft 74 rotates in an opposite direction. As they rotate in opposite directions, the teeth 106 of the drive shaft 64 and the teeth 80 of the output shaft 74 slip against each other due to the ramped portions 84 of the teeth 80, 106. The teeth 80 slide over the teeth 106 causing the output shaft 74 to lift away from the drive shaft 64.

As the connector 76 is coupled with the output shaft 74, it also moves away from the drive shaft 64, out of the magnetic coupling 78, and into the sheath 110. The sheath 110 redirects the magnetic field lines to break the magnetic dipole 120 between the connector 76 and the permanent magnets 122. Upon breaking the magnetic dipole 120 the output shaft 74 is decoupled from the drive shaft 64. When the output shaft 74 is lifted away from the drive shaft 64, the biasing mechanism 94 moves from a retracted position (FIG. 4) to an expanded position illustrated in FIG. 5. The compressive spring 96 expands to hold the output shaft 74 away from the drive shaft 64 after decoupling to prevent a possible recoupling.

Figure 6:
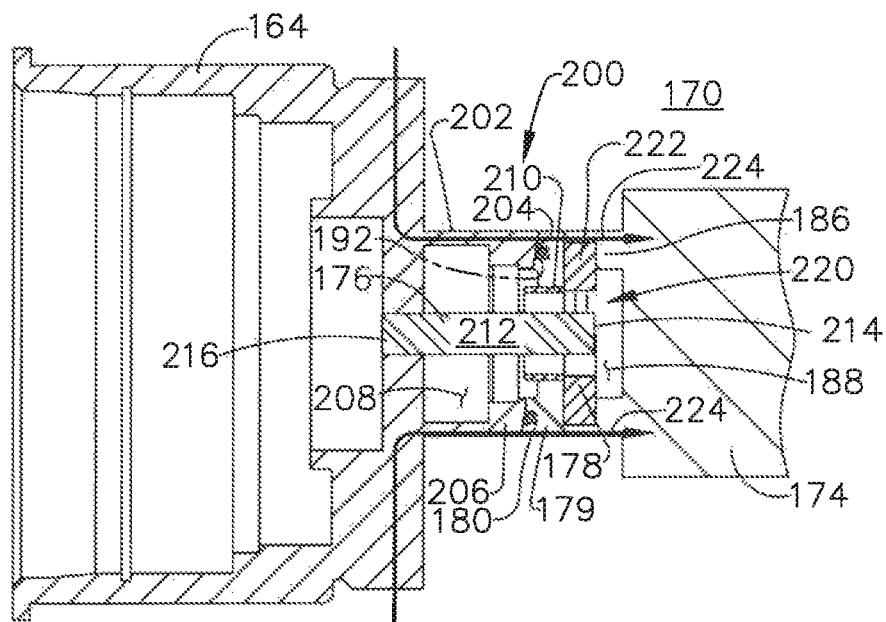
FIG. 6 is a cross-sectional view of a decoupler assembly that can be utilized in the starter of FIG. 2, in a first position.

FIG. 6 illustrates another exemplary decoupler assembly 170 that can be utilized in the starter 10. The decoupler assembly 170 is similar in function to the decoupler assembly 70 illustrated in FIG. 4, therefore like parts will be identified with like numerals increased by 100. It should be understood that the description of the like parts of the decoupler assembly 70 applies to the other exemplary decoupler assembly 170 unless otherwise noted.

As with the previously described decoupler, the output shaft 174 terminates in a first end 179 having mating ramped teeth 180. The teeth 180 circumscribe a cylindrical body 186 of the output shaft 174 at the first end 179. One difference is that the cylindrical body 186 further includes a sheath 210 within an interior 188 of the output shaft 174. The sheath 210 can be a hollow cylinder made of a highly magnetic permeable material. The sheath 210 can be made of, for example but not limited to, cobalt-iron, copper, ferrite, ferritic stainless steel, or a permalloy. Another difference is that a magnetic coupling 178 is formed from a collection of, by way of non-limiting example, permanent magnets 222 circumferentially arranged within the cylindrical body 186 and adjacent to the sheath 210.

The drive shaft 164 terminates in a secondary shaft 202 having an output end 204 with complementary teeth 206 that can mate with the teeth 180 of the output shaft 174. The secondary shaft 202 further includes an interior 208. A connector 176 has a body 212 with a first end 214 and a second end 216. The second end 216 is mechanically coupled to the drive shaft 164. When the decoupler 170 is in the first position, the connector 176 extends from the drive shaft 164 through the interior 208 of the secondary shaft 202 and through the sheath 210 to terminate at the first end 214 within the magnetic coupling 178. The magnetic coupling 178 includes a magnetic dipole 220 formed between the collection of permanent magnets 222 and the first end 214 of the connector 176. In this manner, the connector 176 is selectively axially coupled to the output shaft 164 with the magnetic coupling 178 by the magnetic dipole 220.

A torque path 224 runs from the drive shaft 164 through the teeth 206 and the mating ramped teeth 180 to the output shaft 174 continuing to the AGB 12 and engine 14. Under normal operating conditions, the torque path 224 allows the drive shaft 164 to provide torque to the AGB 12 to start the engine 14.

Figure 7:
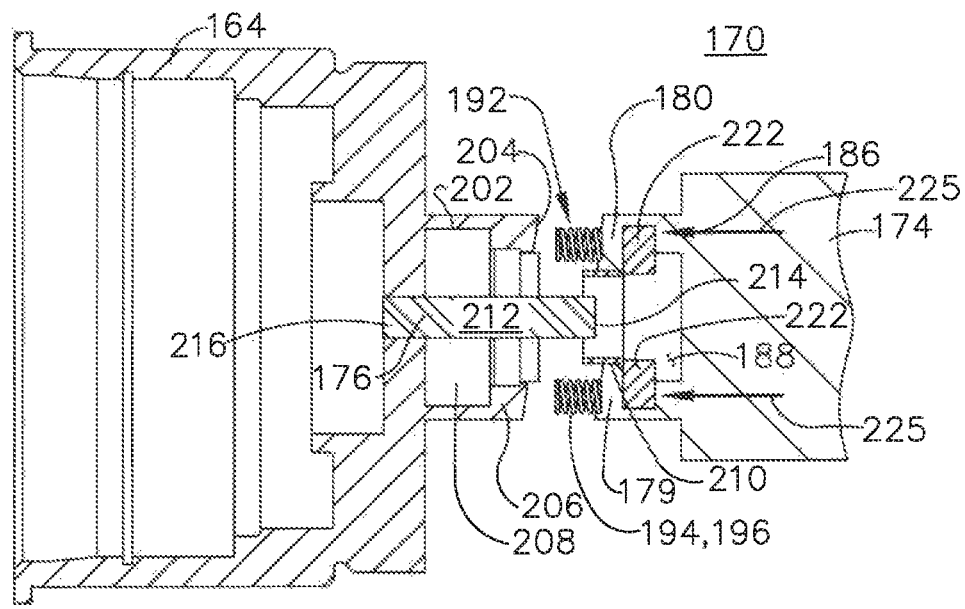
FIG. 7 is a cross-sectional view of the decoupler assembly of FIG. 6 in a second decoupled position.

Turning to FIG. 7, similar to the decoupler assembly 70, the decoupler assembly 170 enables the output shaft 174 to decouple from the drive shaft 164 in the event of a back drive condition. In the decoupler assembly 170, the connector 176 is mechanically connected to the drive shaft 164 while the magnetic coupling is located in the output shaft 174. During a back drive event, as the teeth 206 and 180 lift the output shaft 174 away from the drive shaft 164, the connector 176 does not move. Rather, the magnetic coupling 178 and the sheath 210 move with the output shaft 174. As the sheath 210 passes over the first end 214 of the connector 176 the magnetic dipole 220 between the connector 176 and the permanent magnets 222 is broken. This completely decouples the output shaft 174 from the drive shaft 164. Again, a biasing mechanism 194 can be used to maintain separation.

Figure 8:
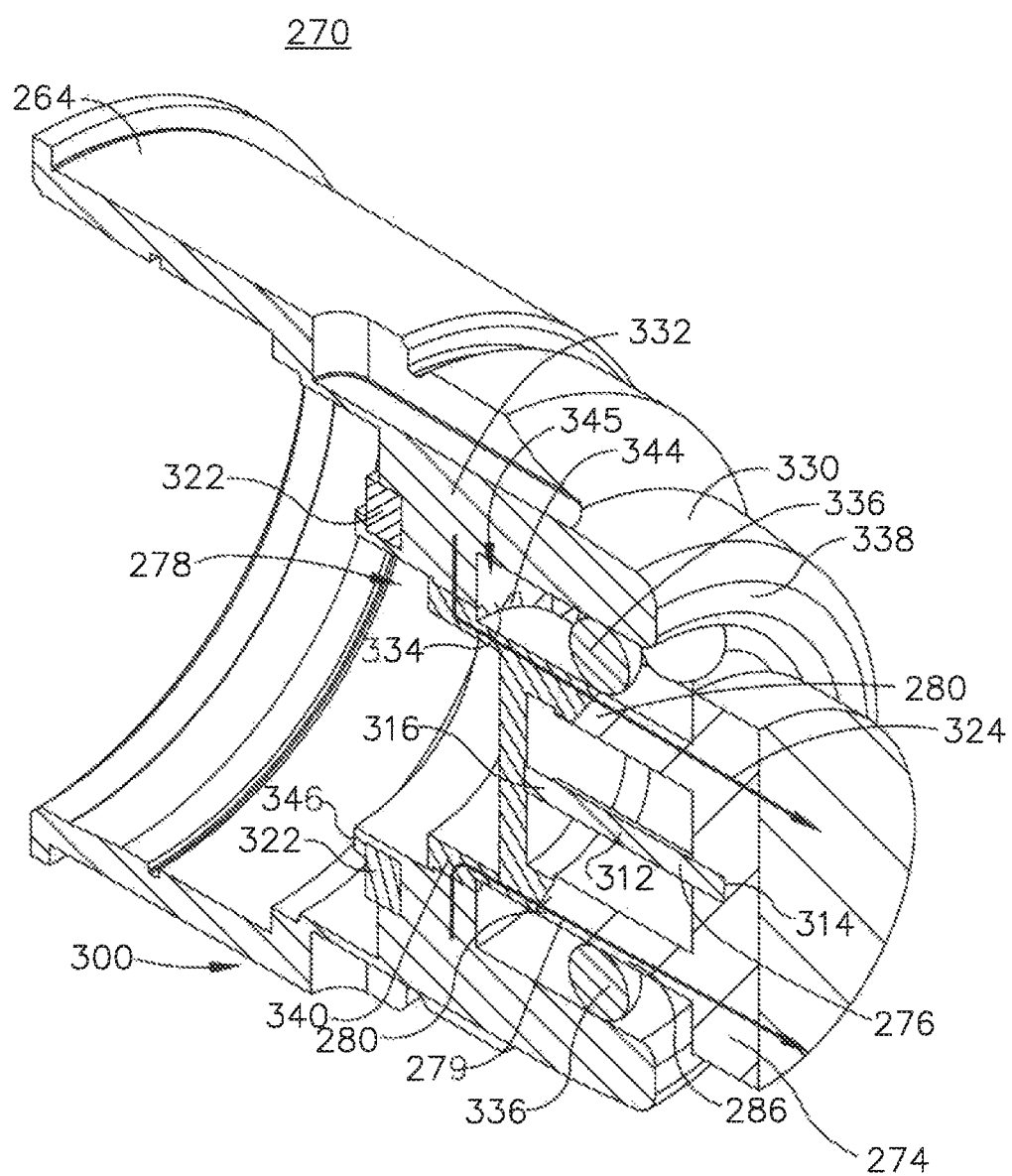
FIG. 8 is a cut away isometric view of a decoupler assembly that can be utilized in the starter of FIG. 2, in a first position.

FIG. 8 illustrates a cut away isometric view of another exemplary decoupler assembly 270. The decoupler assembly 270 is similar in function to the decoupler assembly 70 illustrated in FIG. 4, therefore like parts will be identified with like numerals increased by 200. It should be understood that the description of the like parts of the decoupler assembly 70 applies to the other exemplary decoupler assembly 270 unless otherwise noted.

The decoupler assembly 270 includes a drive shaft 264 terminating in an output end 330. A plurality of permanent magnets 322 are arranged circumferentially within an interior base 332 of the drive shaft 264 to form a magnetic coupling 278. The drive shaft 264 further includes a spline coupler 345 in which spline features 334 can be received.

An output shaft 274 terminates in a first end 279 having teeth 280. The teeth 280 circumscribe a cylindrical body 286 of the output shaft 274 at the first end 279 of the output shaft 274. The first end 279 of the cylindrical body 286 is supported by a set of bearings 336 provided within a tip 338 of the drive shaft 264.

A connector 276 has a body 312 with a first end 314 coupled to the output shaft 274 and a second end 316 coupled to an intermediate connector 340. The connector 276 provides additional axial stability. The connector 276 in one non-limiting example is a tensile fuse. Portions of the output shaft 274 and intermediate connector 340 are located within an interior portion 308 of the output end 330 of the drive shaft 264.

Figure 9:
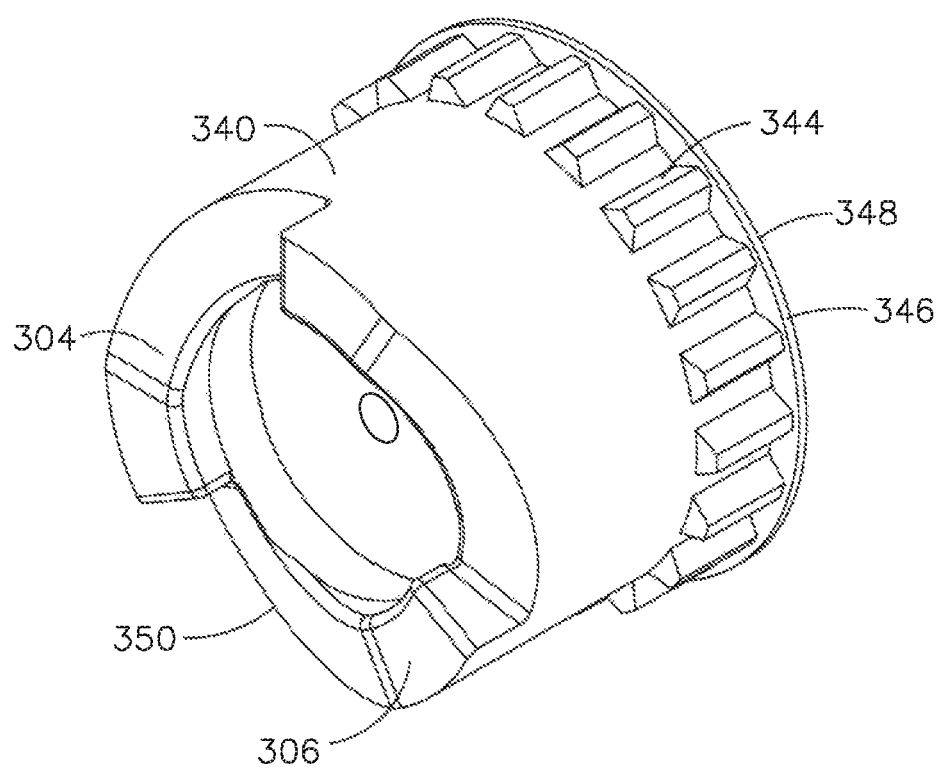
FIG. 9 is an isometric view of a portion of the decoupler assembly from FIG. 8.

The intermediate connector 340 is illustrated in more detail in an isometric view of FIG. 9 and it can more clearly be seen that the plurality of splines 344 circumscribe a base 348 of the connector 340. A projection 346 defines the base 348 of the intermediate connector 340 upon which the plurality of splines 344 terminates. A face 304 having complementary teeth 306 for mating with the teeth 280 of the output shaft 274 is provided at an end 350 opposite the base 348 of the intermediate connector 340. The intermediate connector 340 is coupled to the drive shaft 264 via the spline coupler 334 and plurality of splines 344. The intermediate connector 340 extends towards the output shaft 274 terminating in the face 304 to be selectively coupled to the output shaft 274. The intermediate connector 340 is made of a highly magnetic permeable material, for example but not limited to, cobalt-iron, copper, ferrite, ferritic stainless steel, or a permalloy. During normal operation, the projection 346 of the intermediate connector 340 limits axial movement of the intermediate connector 340 towards the output shaft 274.

Figure 10:
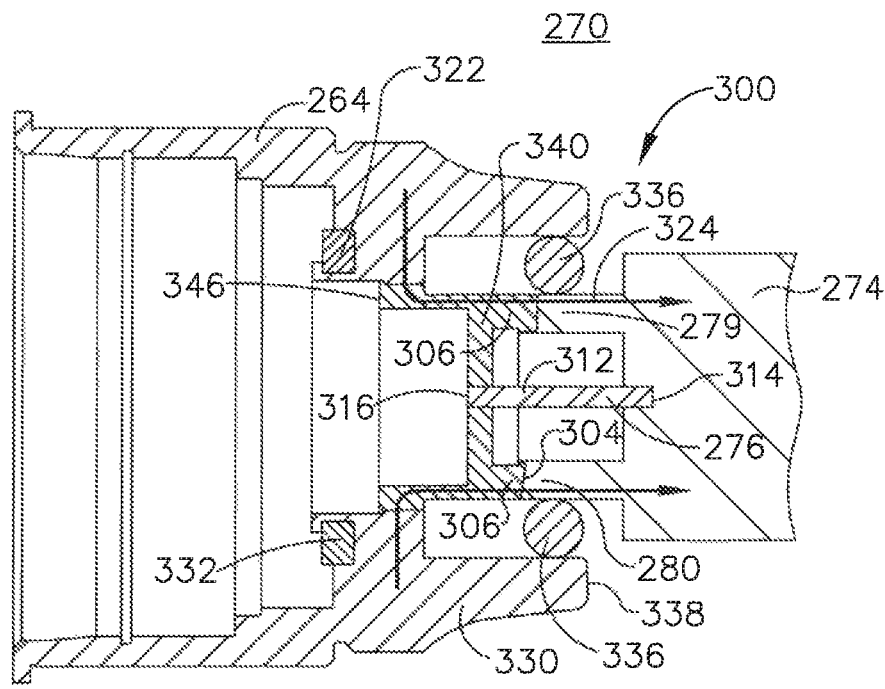
FIG. 10 is a cross-sectional view of the decoupler assembly of FIG. 8 in a first position.

Turning to FIG. 10, the decoupler assembly 270 is illustrated in cross-section in a first position 300. During normal operation, a torque path 324 runs from the drive shaft 264 through the intermediate connector 340, the teeth 306 and the mating ramped teeth 280 to the output shaft 274 continuing to the AGB 12 and engine 14. The teeth 306 of the intermediate connector 340 and output shaft 274 allow for high torque transfer in one direction and slipping in the other. Under normal operating conditions, the torque path 324 allows the drive shaft 164 to provide torque to the AGB 12 to start the engine 14.

Figure 11:
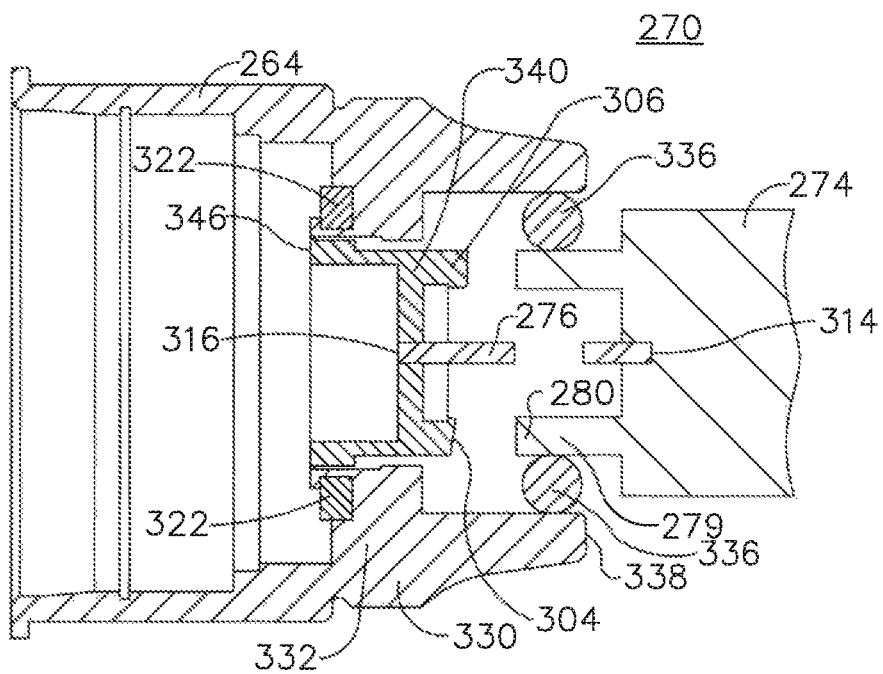
FIG. 11 is a cross-sectional view of the decoupler assembly of FIG. 8 in a decoupled position.

In a back drive event, the decoupler assembly 270 enables the output shaft 274 to decouple from the intermediate connector 340 as illustrated in FIG. 11. During back drive, when the torque path 324 reverses, the teeth 306 and the teeth 280 slide over each other, pushing the intermediate connector 340 further into the drive shaft 264 and away from output shaft 274. As the intermediate connector 340 moves away from the output shaft 274 the connector 276 is configured to shear during the back driving and breaks allowing the intermediate connector 340 to move. The intermediate connector 340 moves within the permanent magnets 322. A magnetic coupling dipole 320 is formed between the permanent magnets 322 and the intermediate connector 340. The intermediate connector 340 is held by the magnetic coupling dipole 320 away from the output shaft 274 such that the output shaft 274 is allowed to spin freely and be decoupled from the drive shaft 264.

Advantages associated with the decoupler assemblies described herein include minimizing the possibility of unintentional re-engagement of the output shaft. This includes preventing undesirable back driving of the starter for a turbine engine. By preventing back driving, wear to the parts described herein, in particular the drive shaft and output shaft decrease. Decreasing wear in turn increases the life of the parts. The decoupler assemblies as described herein enable lower maintenance cost and easy repair.

The connector can provide alignment between both the drive shaft and output shaft. The connector interfaces with the magnetic coupling dipole to offer axial connectivity. Utilizing magnetic dipoles and a connector helps to reduce any impulse associated with back driving. A reduction in impulse also Reduces vibrational noise at the starter which increases efficiency and overall performance.

Additionally with respect to the decoupler assembly including the intermediate connector, when restrictions of drive shaft axial movement towards the AGB occur, the intermediate connector can be placed in between the output shaft and drive connector.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new examples, whether or not the new examples are expressly described. Moreover, while "a set of" various elements have been described, it will be understood that "a set" can include any number of the respective elements, including only one element. Combinations or permutations of features described herein are covered by this disclosure. Many other possible embodiments and configurations in addition to that shown in the above figures are contemplated by the present disclosure. Additionally, the design and placement of the various components such as starter, AGB, or components thereof can be rearranged such that a number of different in-line configurations could be realized.

This written description uses examples to disclose aspects, including the best mode, and also to enable any person skilled in the art to practice aspects of disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An air turbine starter for starting an engine, comprising:
    a housing defining an inlet, an outlet, and a flow path extending between the inlet and the outlet for communicating a flow of gas there through;
    a turbine member journaled within the housing and disposed within the flow path for rotatably extracting mechanical power from the flow of gas;
    a gear train drivingly coupled with the turbine member;
    a drive shaft operably coupled with the gear train, the drive shaft having an output end, and ramped teeth on the output end and
    a decoupler, comprising:
        an output shaft having a first end and a second end, the first end comprising ramped teeth suitable for mating with the ramped teeth of the drive shaft, the output shaft configured to be selectively operably coupled to the drive shaft, the second end of the output shaft configured to be operably coupled to and rotate with the engine, wherein the ramped teeth of each of the drive shaft and the output shaft enable driving torque transfer from the drive shaft to the output shaft, and wherein the ramped teeth of each of the drive shaft and the output shaft are capable of sliding on each other when back driving torque is transmitted such that the output shaft is moved away from the drive shaft;
        a first connector having a body with a first end and a second end and extending between the output shaft and the drive shaft; and
        a magnetic coupling capable of selectively linking the drive shaft to the output shaft via the first connector, wherein when driving torque is transmitted the first connector is magnetically linked to one of the output shaft or the drive shaft via the magnetic coupling and when back driving torque is transmitted the first connector is moved away from at least a portion of the magnetic coupling.

2. The air turbine starter of claim 1 wherein the first end of the body of the first connector is coupled to the output shaft.

3. The air turbine starter of claim 2 wherein the second end of the body of the first connector is magnetically linked to the drive shaft.

4. The air turbine starter of claim 1 wherein the magnetic coupling comprises a magnetic coupling dipole on a portion of the drive shaft and on the first connector, the magnetic coupling dipole configured to provide axial connectivity between the drive shaft and the first connector.

5. The air turbine starter of claim 4, further comprising a sheath located within the drive shaft, wherein the sheath includes a magnetic material.

6. The air turbine starter of claim 5 wherein the second end of the body of the first connector is moveable into the sheath and the sheath is configured to redirect at least a portion of a magnetic field created by the magnetic coupling dipole.

7. The air turbine starter of claim 1 further comprising a biasing mechanism moveable between a retracted position where the biasing mechanism is located within one of the drive shaft or the output shaft and an expanded position where the biasing mechanism is configured to bias away the other of the drive shaft or the output shaft.

8. The air turbine starter of claim 1 wherein the first connector is configured to provide rotational alignment between the drive shaft and the output shaft.

9. The air turbine starter of claim 1 wherein the second end of the body of the first connector is coupled to the drive shaft.

10. The air turbine starter of claim 9 wherein the first end of the body of the first connector is magnetically linked to the output shaft.

11. The air turbine starter of claim 10 wherein the magnetic coupling comprises a magnetic coupling dipole on a portion of the output shaft and on the first connector, wherein the magnetic coupling is configured to provide axial connectivity between the output shaft and the first connector.

12. The air turbine starter of claim 11, further comprising a sheath mounted to the output shaft adjacent the ramped teeth of the output shaft, wherein the sheath includes a magnetic material.

13. The air turbine starter of claim 12 wherein the magnetic coupling dipole comprises magnetic rings spaced from the ramped teeth of the output shaft by at least a portion of the sheath.

14. The air turbine starter of claim 1 wherein the first connector is a tensile fuse configured to shear during back driving.

15. The air turbine starter of claim 1, further comprising an intermediate connector located within an interior of the drive shaft and defining the output end of the drive shaft.

16. The air turbine starter of claim 15 wherein the intermediate connector and the drive shaft have mating spline features.

17. The air turbine starter of claim 15 wherein the intermediate connector further comprises a projection that is configured to restrict axial movement of the intermediate connector.

18. The air turbine starter of claim 15, further comprising a bearing support located within the interior of the drive shaft and configured to rotatably support the output shaft.

19. The air turbine starter of claim 15 wherein the second end of the body of the first connector is coupled to the intermediate connector.

20. The air turbine starter of claim 19 wherein the magnetic coupling comprises a magnetic coupling dipole on a portion of the drive shaft and on the intermediate connector, the magnetic coupling dipole configured to provide axial connectivity between the drive shaft and the first connector.

* * * * *